Sept. 15, 1970  E. E. STRAND  3,528,648
METHOD AND APPARATUS FOR HEAT TREATING WITH THERMAL
REACTOR INCLUDING IMPERMEABLE MEMBRANE
TO EMIT RADIANT ENERGY
Filed Feb. 8, 1968  5 Sheets-Sheet 1

INVENTOR:
ELMER E. STRAND
BY:
B. Dean Criddle
ATTORNEY

Sept. 15, 1970　　　　　　E. E. STRAND　　　　　　3,528,648
METHOD AND APPARATUS FOR HEAT TREATING WITH THERMAL
REACTOR INCLUDING IMPERMEABLE MEMBRANE
TO EMIT RADIANT ENERGY
Filed Feb. 8, 1968　　　　　　　　　　　　　　　5 Sheets-Sheet 2
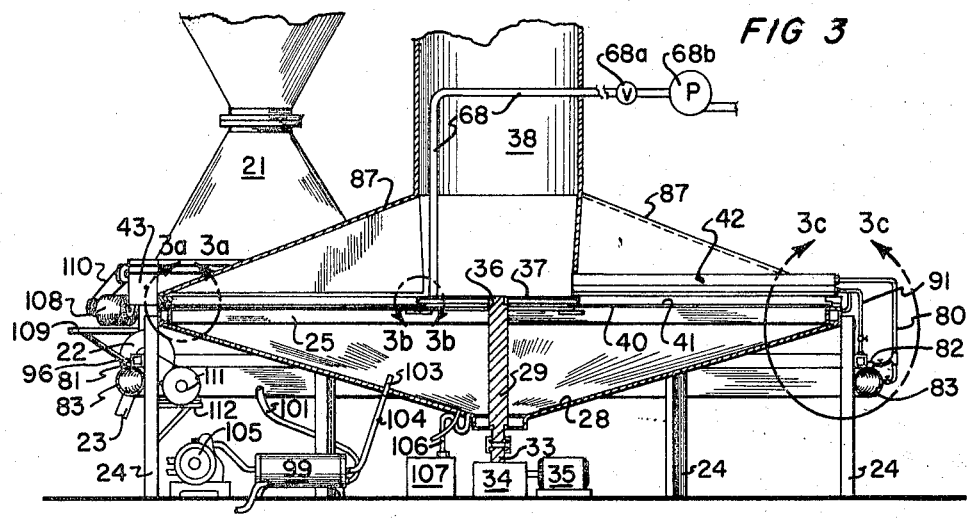
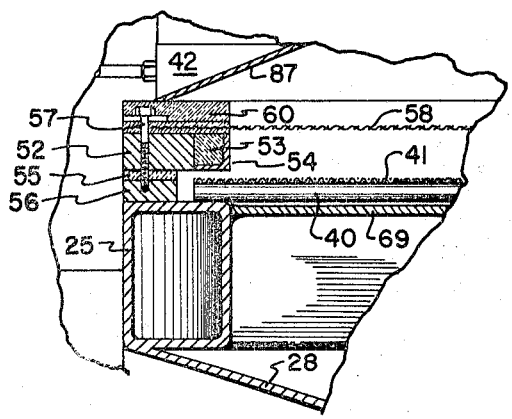
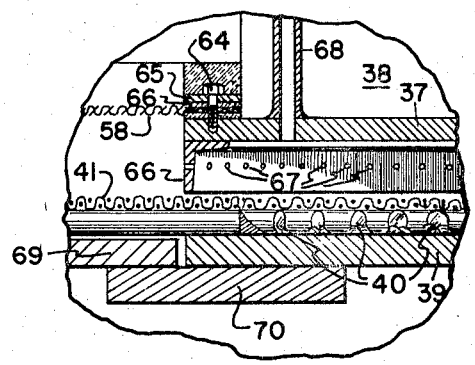
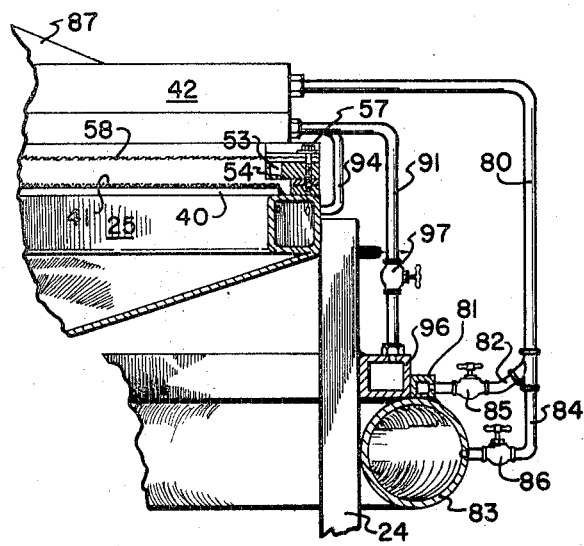
INVENTOR:
ELMER E. STRAND
BY:
ATTORNEY

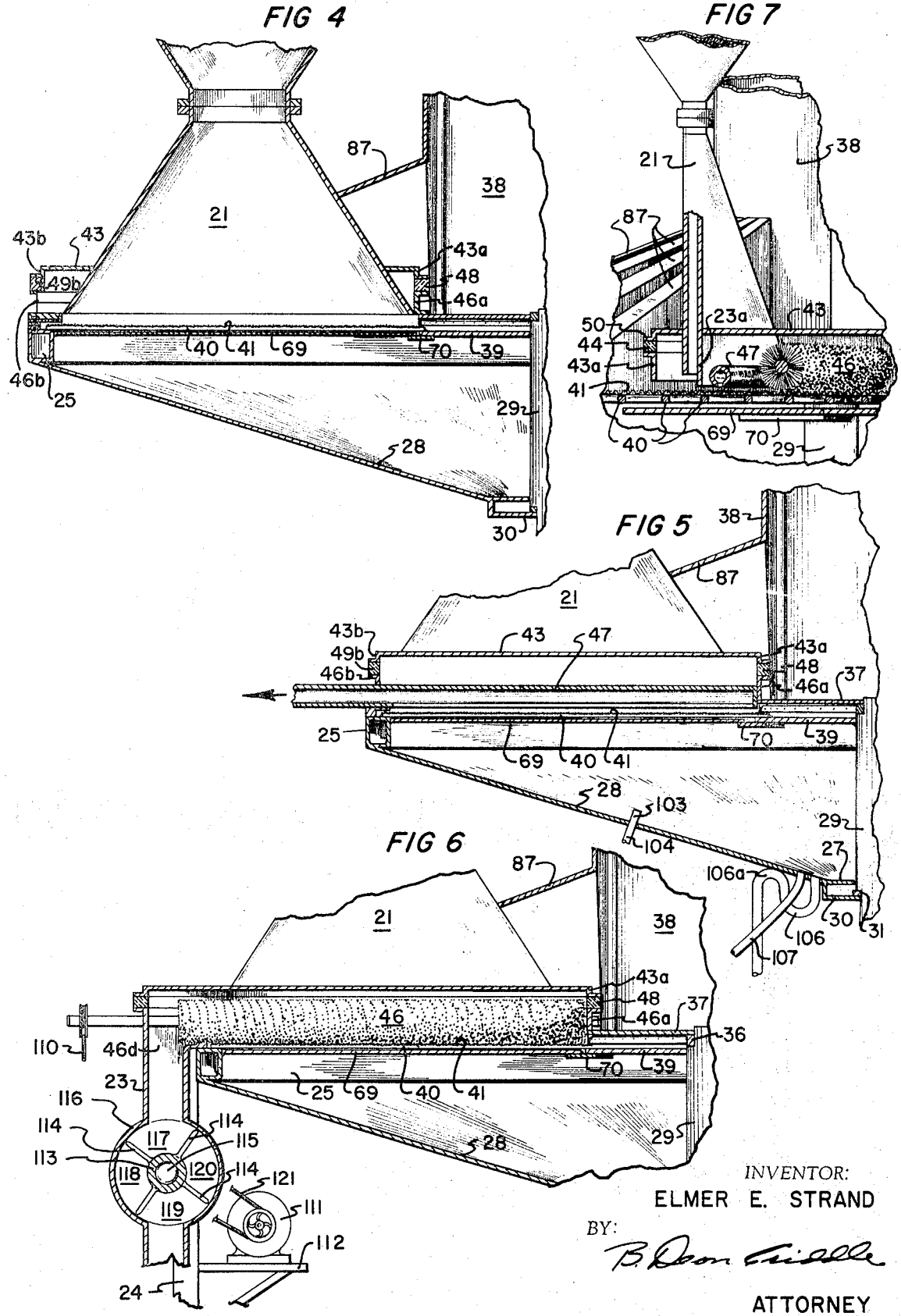

Sept. 15, 1970  E. E. STRAND  3,528,648
METHOD AND APPARATUS FOR HEAT TREATING WITH THERMAL
REACTOR INCLUDING IMPERMEABLE MEMBRANE
TO EMIT RADIANT ENERGY
Filed Feb. 8, 1968  5 Sheets-Sheet 4
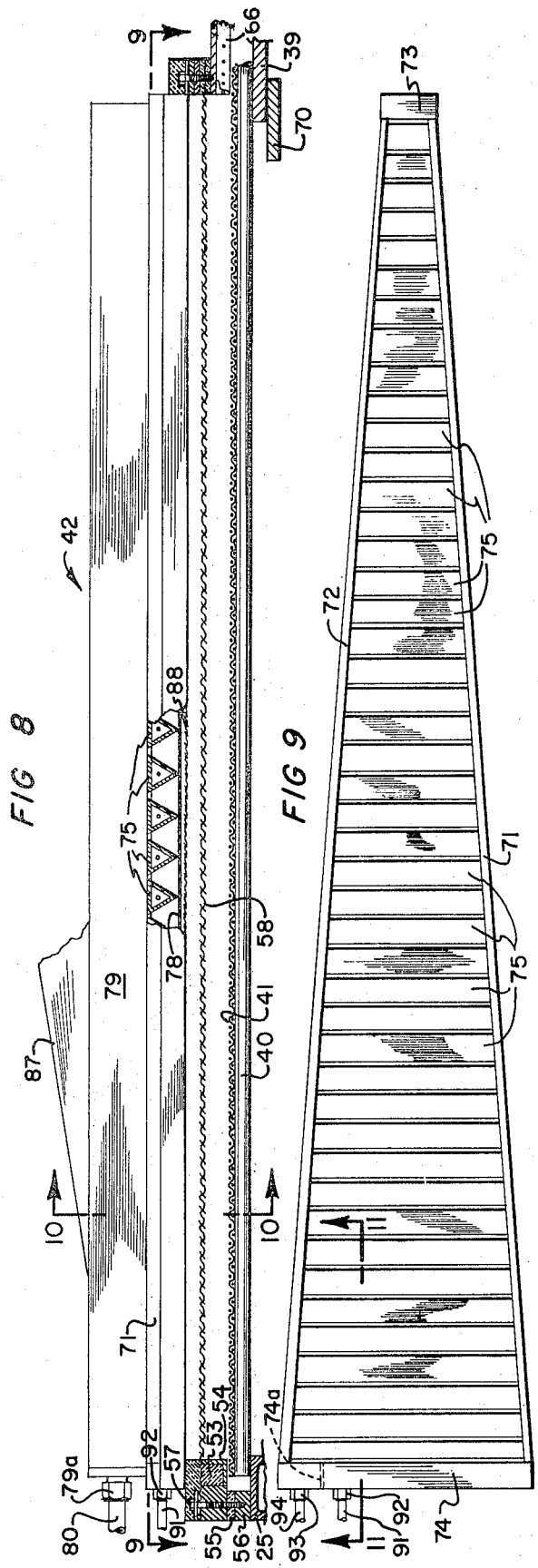
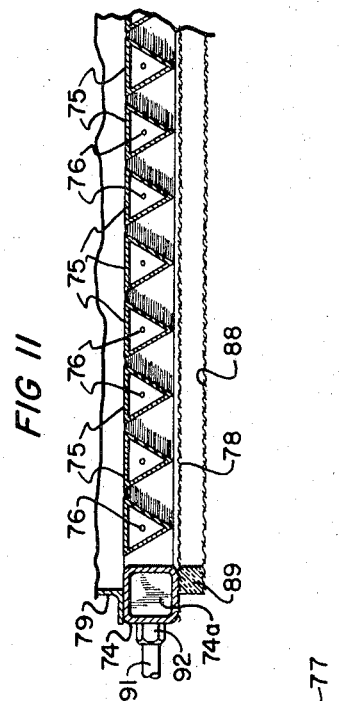
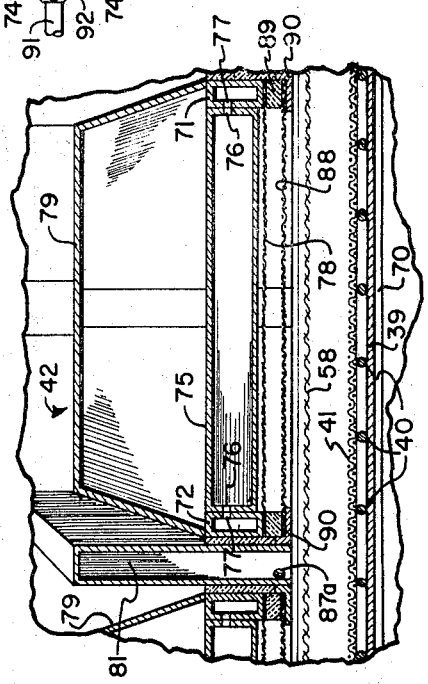
INVENTOR:
ELMER E. STRAND.
BY:
ATTORNEY.

United States Patent Office 3,528,648
Patented Sept. 15, 1970

1

3,528,648
METHOD AND APPARATUS FOR HEAT TREAT-
ING WITH THERMAL REACTOR INCLUDING
IMPERMEABLE MEMBRANE TO EMIT RADIANT
ENERGY
Elmer E. Strand, Salt Lake City, Utah, assignor to
Synthol Corporation, Salt Lake City, Utah, a corpo-
ration of Nevada
Filed Feb. 8, 1968, Ser. No. 704,067
Int. Cl. F28b *21/02;* C21b *1/08;* F23m *9/00*
U.S. Cl. 263—50
16 Claims

ABSTRACT OF THE DISCLOSURE

A continuous-feed type reactor having a reaction chamber with a perforate support screen onto which ore or other suitable material to be thermally treated is fed. The screen is rotated beneath an impermeable membrane that transmits and radiates heat from surface combustion heaters, but that will not pass combustion gases. Products released from the heat treated material are removed separately from the residue, which is continuously discharged through an air lock that blocks entrance of air to the reaction chamber. For those reactions where air or a reducing agent is desired, it can be supplied in controlled amounts to the reaction chamber.

BRIEF DESCRIPTION

Figure 1:
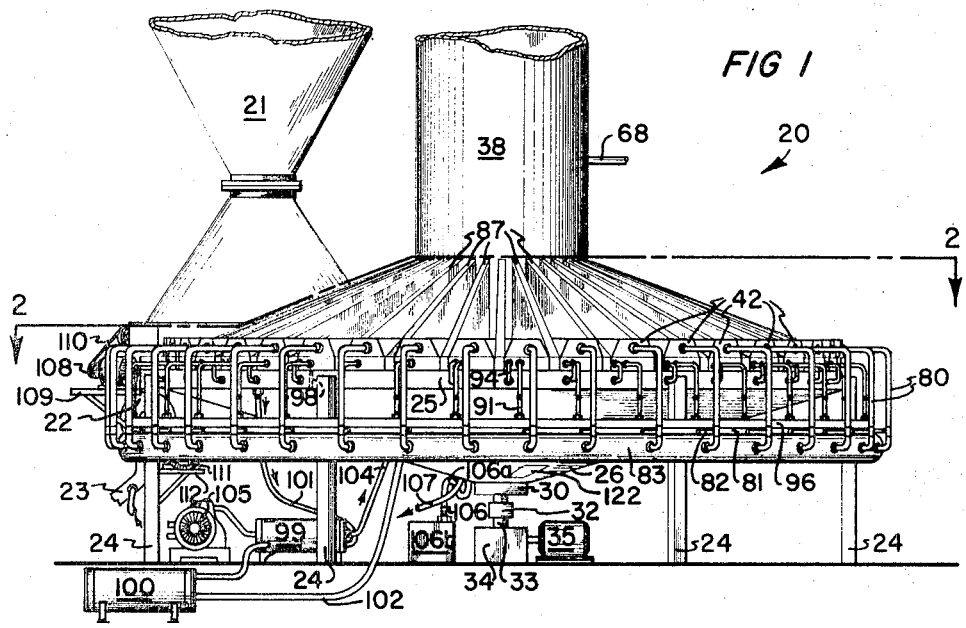

It has long been desirable to heat metallurgical ores at controlled temperatures and for controlled periods of time. It is necessary in the treating of some ores, for example, to preheat or dry them prior to further processing or to roast or reduce them as part of the processing operation. Thus, various retorts and furnaces have been developed in the past for use as thermal reactors in the heat treating of ores. However, there has not heretofore been developed a reactor that can be used for all types of heat treatment of metallurgical ores and also of other materials, and that can develop and maintain even very high temperatures without creating combustion gases that adversely affect the products released from the heated material by the heating thereof. With such high temperatures, the ores being treated can be heated very rapidly and need be exposed to the heat source for only a very short period of time. Furthermore, the previously known furnaces and retorts have not been entirely satisfactory for other reasons. For example, some have not permitted rapid, continuous operation, some are unduly expensive to construct and operate and some do not provide for efficient handling of the products released by heating, or of the residue remaining after the ores have been heat treated. Others do not efficiently apply heat to the ore.

Principal objects of the present invention are to provide a thermal reactor that is economical to construct and operate and that will continuously and efficiently heat ores to desired reaction temperatures in a very short period of time and that will provide for efficient recovery of the products released by the heat treating.

Principal features of the present invention include a reaction chamber formed at one side of a perforate screen and a collection chamber at the other side. An impermeable membrane, spaced from the perforate screen, transmits and radiates heat from surface combustion-type burners at the opposite side thereof to the reaction chamber, but prevents the passage of gases of combustion. Means are provided for spreading ore, or other material to be heat treated, in a thin layer, over the perforate screen; passing the screen and the material thereon beneath the imperforate membrane for a predetermined period of time; removing liquid, vapor, and solid products resulting from heating of the material; and removing the residue left after the material has been heat treated.

The illustrated perforate screen is circular and is rotated to move material that is continuously fed thereon around a central axis that is surrounded by the surface combustion heaters. The residue remaining after the material has been heat treated is removed from the perforate screen, as by a brush or vacuum, or combination of both, while products released by the heating of the material can be passed through the perforate screen to be readily recovered.

The base vessel forming the collection chamber is insulated from the walls of the chamber so that the products released from the heat treated ore and passed downwardly through the perforate screen will be subjected to a desired temperature change. The impermeable membrane acts as a black body member to absorb virtually all of the radiant energy applied to it from above and thereafter radiate energy downwardly from its lower surface to the thin layer of material spread therebeneath, thereby efficiently heating all of the bodies making up the material.

Additional objects and features of the invention will become apparent from the following detailed description and drawings, disclosing what is presently contemplated as being the best mode of the invention.

THE DRAWINGS

Figure 2:
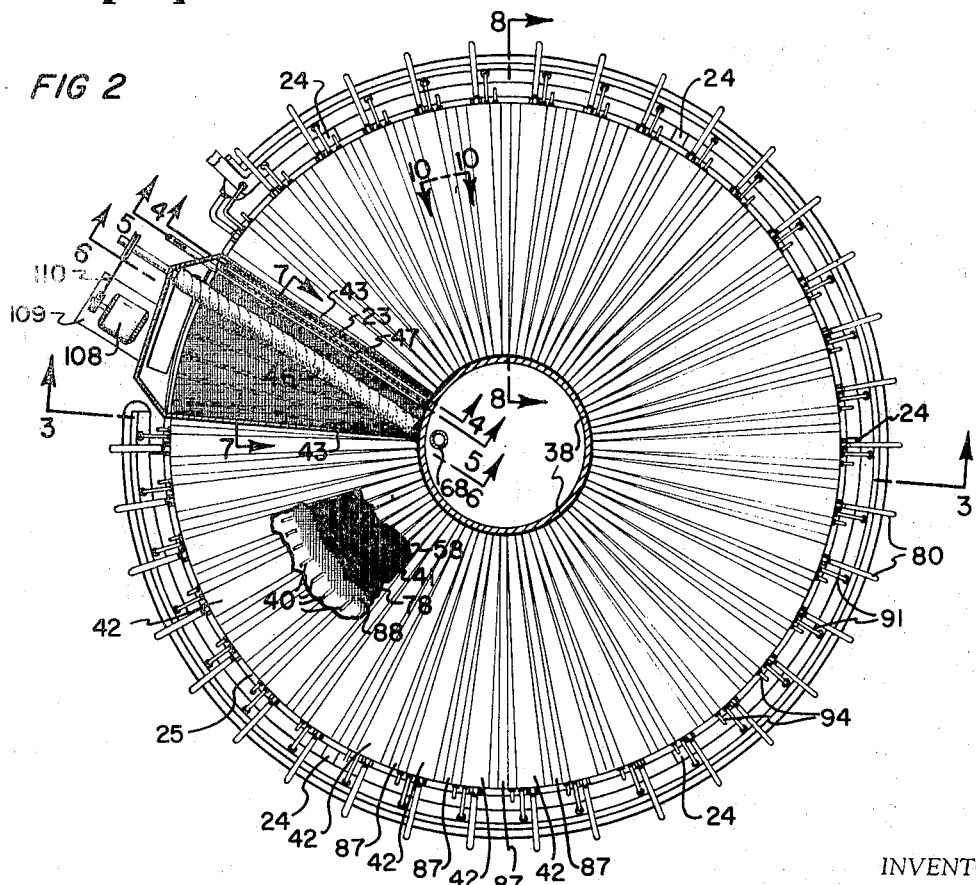
Figure 12:
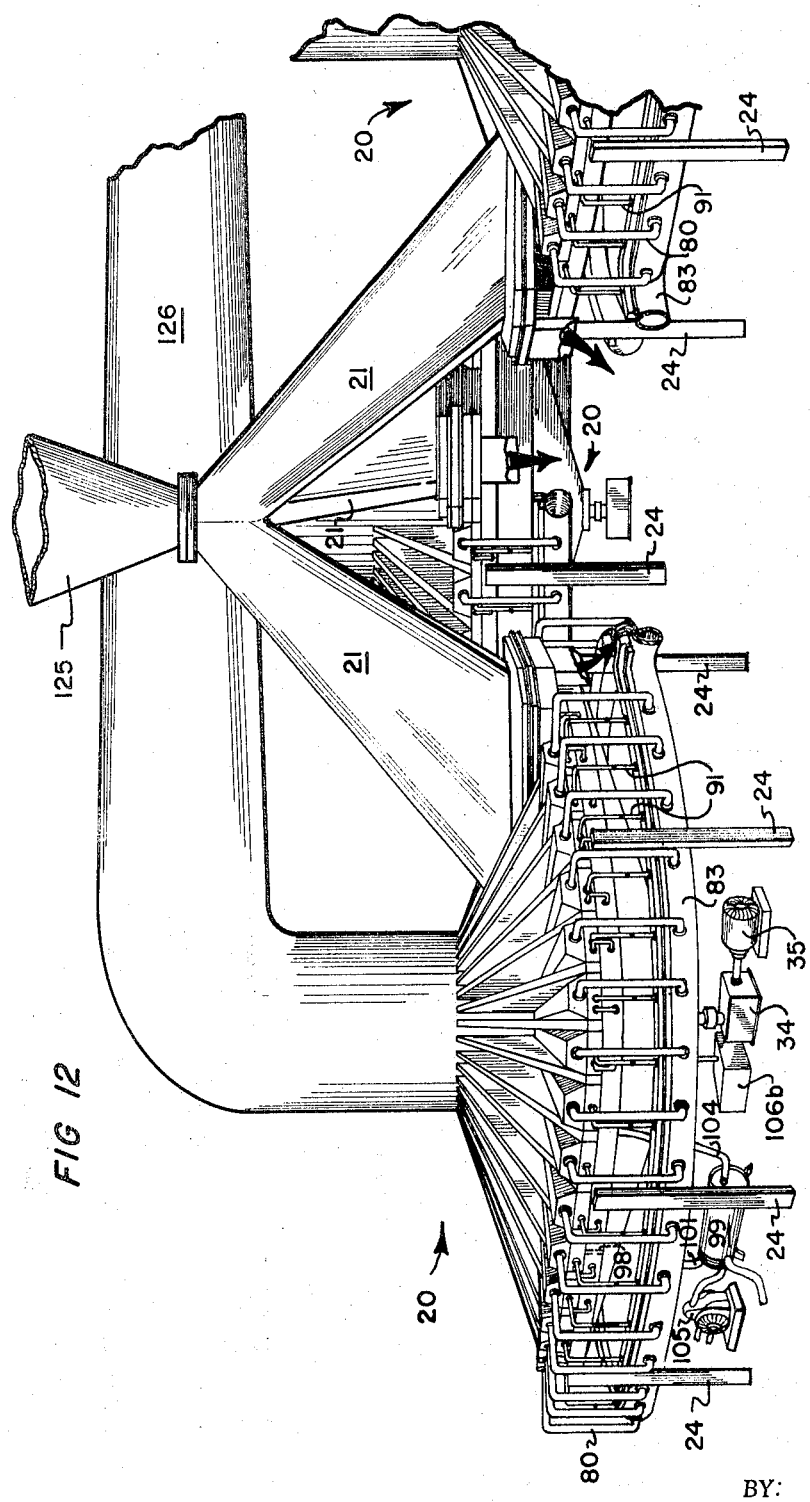

FIG. 1 is a side elevation view of the reactor of the invention;

FIG. 2, a horizontal section view taken on the line 2—2 of FIG. 1 and partially broken away to show the interior construction of the reactor;

FIG. 3, a vertical section, taken on the line 3—3 of FIG. 2;

FIGS. 3a–3c, enlarged sections, taken within the lines 3a, 3b, and 3c, respectively of FIG. 3, but with FIG. 3c drawn to a smaller scale than are FIGS. 3a and 3b;

FIGS. 4–8, enlarged vertical sections, taken on the lines 4—4 through 8—8, respectively, of FIG. 3, but with FIG. 8 drawn to a larger scale than are FIGS. 4–7;

FIG. 9, a horizontal section, taken on the line 9—9 of FIG. 8;

FIG. 10, a vertical section, taken on the line 10—10 of FIG. 8 and drawn to an even larger scale;

FIG. 11, a vertical section, taken on the line 11—11 of FIG. 9 and drawn to an even larger scale than is FIG. 9; and FIG. 12, a perspective view of three reactors of the invention, showing how they can be commonly connected.

DETAILED DESCRIPTION

Referring now to the drawings, in the illustrated preferred embodiment, the reactor of the invention, shown generally at 20, receives material to be heated from a feed hopper 21 and discharges residue through an air lock 22 and a chute 23.

Legs 24 hold the reactor above ground and the legs are each secured to and depend from a ring 25. Ring 25 is of tsainless steel and is shown as being of hollow, rectangular configuration, but it could as well be of other materials and have other cross-sectional configurations, if so desired.

A stainless steel, conical base 26 has its large outer edge fixed to ring 25 and is inverted so that material on the inside thereof will tend to move, under the influence of gravity, towards a central lowermost collection point 27, shown in FIG. 3. The wall 28 of the base is inturned at point 27 to closely surround and to form a seal with a central post 29, and a collar 30 extends downwardly from and inwardly with respect to wall 28 to support a bearing 31 on which a shoulder of post 29 rests. While base 26 is here shown as being of conical configuration, it could also be concave, have a series of interconnected straight walls or be of other suitable design.

Post 29 extends downwardly through bearing 31 and is coupled at 32 to the output shaft 33 of a speed reducer, gear box 34, the input shaft of which is driven by an electric motor 35. Thus, operation of motor 35 will rotate post 29 at a speed determined by the ratio of the gears in gear box 34.

The upper end of post 29 is journalled and held centered in a bearing 36 that is surrounded by a fixed plate 37 on the bottom of a central exhaust stack 38.

Another plate 39, fixed to post 29 a spaced distance below plate 37, rotates with the post.

Rods 40, radiating like spokes from plate 39, have their free ends resting on ring 25 and a fine mesh, stainless steel support screen 41 rests on and is tautly stretched over the rods 40. The rods 40 and screen 41 rotate with the post 29 to carry ore to be treated beneath a series of surface combustion heaters 42, and beneath an impermeable member to be described.

As is best seen in FIGS. 4–7, ore, which is typical of the materials to be heat treated with the reactor, is fed in through chute 21 and a housing 43 that is mounted above screen 41, and is leveled out and spread evenly over the screen 41 as the rotating screen moves it beneath an edge formed by an edge 43a that is fixed beneath a piece of heat insulating material 44 that depends from housing 43. If desired, edge 43a can be made of two plates, one of which is slidably adjustable with respect to the other so that the thickness of the layer of material placed on support screen 41 can be regulated. As will be further explained, the ore is rotated beneath heaters 42 and the resultant residue is passed beneath another edge 45, depending from housing 43 and formed from heat resistant material, to where a brush 46 has the opposite shaft ends of its central shaft journalled in upstanding members 46a and 46b on the plate 39 and fixed to ring 25, respectively. The spiraled bristles of the brush sweep screen 41 to push the residue across a plate 46c that interconnects the bottom of upstanding member 46a and the top or ring 25, and through an opening 46b therein to the discharge chute 23. Any residue carried by the support screen, past brush 46, will be removed through a slotted conduit 47 that is connected to a source of vacuum, not shown. A rear wall 23a of chute 23 may extend into housing 43 and close to screen 41, to block residue that has been moved past the brush 46 and to position it for removal through the vacuum conduit.

Housing 43 is tapered inwardly to an inner end 43a that also has a depending piece of heat insulating material 48 that rests on and that is fixed to upstanding member 46a. The edges 44 and 45 extend downwardly from flanges 50 and 51, respectively, FIG. 7, to rest on a ring 52, shown best in FIG. 3a, that has an inner core of heat insulating material 53 and an L-shaped outer ore guide 54. Ring 52 rests on a gasket 55 of heat insulating material and gasket 55 sits on a tapped spacer ring 56 that is welded or otherwise affixed to the top of ring 25 and that has tapped holes spaced therearound to rceive the ends of threaded bolts 57. Bolts 57 are inserted downwardly through flanges 50 and 51, edges 44 and 45, ring 52, and gasket 55 to be threaded into ring 56. The outer end 43b of housing 43, also has a depending insulation member 49 that rests on and is fixed to upstanding member 46b.

An impermeable and substantially rigid membrane 58, made, for example of carbon cloth, heavily coated with a CS90 ceramic material, made by the Lithoid Corporation, is bonded or otherwise affixed to the outer sides of side edges 44 and 45, is clamped above spacer ring 52 (FIG. 3a) and plate 37 (FIG. 3b) and is tautly stretched a spaced distance above screen 41. If desired, reinforcement rods having approximately the same coefficient of expansion as the ceramic coated carbon cloth can be affixed to the top of the membrane to reinforce it, and to make it even more rigid.

Other materials could be used to form the impermeable membrane so long as they will withstand the temperatures and corrosiveness to which the membrane is subjected and providing they have the characteristics of black body, so that efficient heating will be obtained.

Outer ore guide 54 is positioned just slightly above the top face of screen 41 and provides a guide for the ore as it is moved by the rotating support screen. The insulating material 53 behind the ore guide prevents undesired conduction of heat from the heated ore, through guide 54 to the base vessel 26. Gasket 53 also serves as a barrier to such heat transfer, and water passed through hollow ring 25 provides a still further barrier against heat transfer to the collection chamber.

Impermeable membrane 58 is clamped at its outer edge above ring 52 by additional bolts 57 that are passed downwardly through a member 59 that is inset into an insulation member 60, on which the outer ends of the heaters 42 are positioned, through ring 52 and gasket 55 and into the tapped holes provided therefore in ring 54.

At its inner edge, membrane 58 surrounds and fans outwardly from central exhaust stack 38 and is clamped between insulation gaskets 62 and 63 by bolts 64 passed through ring 65, the gaskets, and the membrane, to be threaded into tapped holes provided therefor in plate 37.

The space below membrane 58 and above screen 41 will receive the ore to be heated and forms the reaction chamber of the invention, while the interior of base 26, below support screen 41, serves as the collection chamber.

An inner ore guide 66, FIG. 3b, having spaced holes 67 therethrough, has one leg extending downwardly from plate 37 to a point above the top surface of screen 41 so that oxygen or air, brought into proximity with plate 37 by a conduit 68, will be evenly distributed through the holes 67 to the reaction chamber. Conduit 68 extends upwardly inside stack 38 and then is passed through the wall of the stack to be connected to a blower 69, shown schematically in FIG. 3 or other suitable source of air, oxygen, or fluid reducing agent. A valve 68a can be used to regulate the flow through conduit 68.

Although the illustrated arrangement for positioning housing 43 and membrane 58 has been found satisfactory, other arrangements could be used. For example, the impermeable membrane could be ceramic bonded in place, rather than being clamped by bolts, between ring members. It is only necessary that an impermeable membrane be fixed in position above a rotating screen or other such suitable, perforate support membrane and that means be provided for feeding ore to be treated onto the screen in thin layers, and for removing the residue left after the ore has been heat treated. The completed system must provide a combustion chamber that is sealed from the reaction chamber, and to faciliate removal of products resulting from the heat treatment of material on the support screen should include some means for creating a pressure differential at opposite sides of the support screen.

In order to provide adequate support beneath the rods 40 that underlie screen 41 at the areas where material to be heated is dropped on and from where the residue is removed, a plate 69 is placed beneath housing 43. Plate 69 is fixed to ring 25, as by welding, and rests on a ring plate 70 that is fixed to and projects outwardly from the bottom of the plate 39 that is fixed to post 29. Ring plate 70 thus supports the inner end of plate 69 while sliding beneath it as the post 29 and plate 39 rotate.

Ore, or other material to be heat treated, is deposited on screen 41, through chute 21, and as the screen is rotated the ore is passed beneath the impermeable membrane 58, from which a controlled amount of heat is radiated. Heat is supplied to membrane 58 from the spaced surface combustion heaters 42, positioned thereabove.

Each of the illustrated surface combustion heaters (FIGS. 8–11) includes a lower frame, having a coolant circulating system made up of hollow side members 71 and 72 that converge to be connected at one of their ends by a hollow end member 73. The other ends are more widely spaced and are connected by a hollow member 74 that has a partition 74a intermediate its length.

Spaced between end members 73 and 74 and interconnecting the side members 71 and 72 are a series of intermediate, elongate, hollow members having a triangular cross section. Each intermediate member 75 has its ends welded to the side members 71 and 72 and orifices 76 through the ends are aligned with orifices 77 in the side walls to connect the interiors of the intermediate members with the interiors of the side members. The members 75 are arranged with their apexes turned down and their bases spaced slightly apart. The side walls of the triangles thus form reflectors for a purpose to be more fully explained. A burner screen 78, made for example, of a suitable ceramic coated wire screen or cloth, is stretched tautly below the apexes of the triangular members 75, and is bonded to the bottoms of side members 71 and 72 and the end members 73 and 74.

A closed hood 79 is fixed to the side and end members of the lower frame of each surface combustion heater and a fitting 79a in the large end of the hood is adapted to have a fuel line 80 connected thereto. Gas is supplied to each fuel line 80 from a small header pipe 81, FIG. 3c, that extends around the legs 24 through a connector pipe 82. A larger header pipe 83, positioned below header pipe 81 carries air to be mixed with the gas, prior to introduction of the air and gas fuel mixture into the hood. The air header is connected to each line 80 through a pipe 84. The ratio of air and gas is regulated to give maximum burning efficiency by control valves 85 and 86 in the lines 82 and 84, respectively.

The fuel mixture entering hood 78 is forced downwardly through the small openings between the bases of intermediate members 75 and the burner screen 77, into the combustion chamber formed between the burner screen and the impermeable membrane, where it is ignited to burn on the bottom face of the burner screen.

The combustion gases formed during the burning of the fuel gas are carried away from the combustion chamber immediately after they are formed, through ducts 87, FIG. 10, that are positioned adjacent to each heater 42 and the vent stack 38 into which the ducts 87 open. The vent stacks are shown as being individually formed and as being connected to the heaters by bolts 87a, but a single hood could as well be used.

The heat generated by the burning fuel is efficiently applied to the impermeable membrane 58, since the cool side walls of intermediate members serve as reflectors for the heat radiated toward them, to direct it back toward the impermeable membrane. The intensity of the heat is further increased by a reverberator screen 88 that is stretched and secured between an insulating member 89 that is affixed to the bottom of the burner screen where the burner screen is fixed to the end and side members and an angle member 90. A reverberator screen is conventional on surface combustion heaters and greatly aids in building up the temperature of the burner screen to incandescence. As has been noted, the impermeable membrane acts as a black body, absorbing the radiant energy applied to it from the screen assembly and reflectors. The impermeable membrane becomes intensely hot and radiant energy is emitted from its lower face to the material being passed therebeneath in the reaction chamber. At the same time the combustion gases formed above the impermeable membrane are conducted away through the ducts 87 and vent stack 38.

To insure maximum effectiveness of the heater, the intermediate members 75 are made of a highly reflective material, such as stainless steel or polished aluminum, and the impermeable membrane is made to withstand the temperatures, i.e. 3000° F. or more to which it will be subjected.

The side, end and intermediate members are cooled by circulating water through them, so they are not adversely affected by the temperatures created by the burning fuel, prevent flash back, and efficiently reflect radiant energy to the screen assembly and impermeable membrane. The water is supplied through an inlet pipe 91 connected to a fitting 92 opening into end member 74 at one side of partition 74a and is passed through side member 71, end member 73 and side member 72 before exiting through fitting 93, connected into end member 74 at the other side of partition 74a and pipe 94, connected to fitting 93. The water is also passed through each of the intermediate members 75, from side member 71 to side member 72. The sizes of the passages through end member 73 and the intermediate members are designed to insure continuous flow through each of the respective members.

The use of closely spaced intermediate members through which the fuel is distributed to the burner screen insures an even distribution of fuel gas to the burner screen and insures proper incoming velocity of the gas entering the plenum chamber formed between the intermediate members and the burner screen so that efficient burning is obtained. In addition, since the spaces between intermediate members are small and the surfaces of the intermediate members are cooled, the fuel in the hood remains relatively cool and that passing between the intermediate members is cooled so that there is little, if any, danger of flash back from the combustion chamber to the fuel in the plenum chamber formed between the intermediate, end and side members and the burner screen. The gases of combustion remain relatively cool as they escape. Radiant energy is reflected to and through the burner screen and the impermeable member so that the material passed therebeneath is subjected to intense heat.

The fuel in the plenum chamber and inside the hood is further insulated against its being ignited by layers of insulation 95, placed between the outer walls of members 71 and 72 and the ducts 87. This also prevents the water in members 71 and 72 becoming heated and insures continued effective cooling of the intermediate members 75 by the water.

While a particular surface combustion heater has been herein described, it should be obvious that others capable of continuously generating the required heat could be used. For example, heaters like those shown in my copending U.S. application for patent, Ser. No. 550,570, filed June 6, 1966, could be used, if designed to fit in position above the rotating screen 41 of the reactor.

The water inlet pipe 91 of each heater is connected to a water header 96 and has a control valve 97 therein. The water outlet pipe 94 of each heater is connected to the interior of ring 25, and ring 25 has a partition 98 therein. The water is discharged from ring 25, at one side of the partition 98 and is circulated through a coolant coils of a heat exchanger 99, and a refrigeration unit 100, by lines 101 and 102, respectively, before being readmitted to the ring 25 at the other side of partition 98.

Water is, therefore, continuously circulated into and through the closed system consisting of pipe 25, pipe 91, the side, end, and intermediate members of the heater, pipe 92, ring 25, line 101, the coolant coils of heat exchanger 99, refrigeration unit 100 and line 102. The water serves as a coolant and/or heat transfer barrier for the base, the heaters and the heat exchanger before it is recooled by the refrigeration unit.

A standpipe 103 extends through the side wall 28 of base 26 and upwardly into the collection chamber formed interiorly of the base. The other end of standpipe 103 is connected by a line 104 to the intake side of heat exchanger 99, the other side of which is connected to the intake of a pump 105.

In practice, gases released from heat treated material and passed downwardly through support screen 41 into the collection chamber will be removed through standpipe 103 and will be cooled in the heat exchanger 99. Pump 105 will then deliver the gases to any desired location. The pressure differential developed between the reaction chamber and the collection chamber will tend to force the released products of the heating through the support screen to the collection chamber therebeneath.

Liquids passed downwardly through screen 41, or that are formed by the condensation of gases passed through the screen, follow the inner surface of wall 28 to the low point therein and then are discharged through a conduit 106 extending therethrough to be flush with the bottom, to a catch receptacle 106b. If necessary, or desirable, phase separation of the liquids may be possible. In recovering mercury, for example, by oxidizing cinnabar ores, the heavier mercury will gravitate to the lowermost point in base 28 and will then enter conduit 196. The conduit has an upturned portion at 106a that effectively forms a trap for the mercury and that maintains it in the base at a level above the lowermost point thereof. Water also released from the heat treated ore then collects on top of the mercury and is removed from the base through another conduit 107 that enters the base at a point just below the level at which the mercury is maintained and just above the opening into conduit 106.

A motor 108, mounted on a support platform 109, fixed to one of the legs 24, is arranged to continually drive brush 46. As illustrated, the motor is connected to brush 46 by a belt 110 that is passed around pulleys on the output shaft of the motor and the central shaft of the brush, but obviously other drive arrangements could be used.

Another motor, 111 is mounted on a similar support platform 112 and is arranged to continually drive the interior member 113, FIG. 6, of the air lock 22 that is positioned in chute 23. Interior member 113 is formed by four baffles 114, radiating outwardly from a center axle 115. The baffles fit tightly, but rotatably, within a housing 116 and form between them and with the walls of the housing, four compartments 117–120. Axle 115 extends through housing 116 to be driven by the motor 111, through a belt 121 and pulleys on the output shaft of the motor and the axle. As the axle is turned the compartments are sequentially moved into position to receive residue material moved by brush 46 to opening 46d and dropped down into chute 23, a sealed position, a discharge position wherein the material is released to continue its travel through chute 23 and another sealed position. Little, if any, air can pass upwardly through chute 23, into the reaction chamber, since the air lock at all times provides a barrier to such air movement. Thus, if any air is to be admitted to the reaction chamber, it will be in controlled amounts, through conduit 68. The nature of the process for which the reactor is used will be the determinative of whether or not air or a reducing agent is so introduced.

While the motor 111 is shown connected to axle 115 by belt 121, it should be apparent that other drive connections could be used.

The thermal reactor here described can be used in a variety of ways, to obtain diverse results. Because the speed of travel of ore or other material to be treated can be readily changed, as desired, merely by changing the driven speed of post 29 and because the temperatures developed by the surface combustion heaters can be controlled and can be very hot, many different results can be achieved. It can be used, for example, in calcining, reduction of oxides, roasting of sulfides, or the drying of materials.

The reactor is very efficient since the material to be treated is spread in thin layers such that all particles are readily and quickly exposed to treatment, and nearly all of the radiant heat energy is radiated from flat surfaces to the material being treated. There is, therefore, very little heat loss and the treatment can occur within a calculated minimum time period.

It is a simple matter to change the base 26 to allow for recovery of different types of products of the thermal reaction. For example, it has been found that in the treatment of elemental sulfur, apparently because of the temperatures created in the reaction chamber and the temperature and pressure differential existing between the reaction chamber and the collection chamber, sulfur is collected in crystal form as flowers of sulfur. Although the exact point where the change of state takes place is not discernible by observation, it can be observed that the sulfur apparently sublimes as it passes through the perforate support screen on which the ore being treated is spread.

Thus, if desired, a door 122, FIG. 1, through wall 28 of base 26, can be provided to allow periodic withdrawal of the solid sulfur. Although apparatus therefore is not shown, it is anticipated that a mechanical scraper could also be used to scrape the sulfur from wall 28, so that it could be more easily collected, or that the base vessel could be heated to melt the sulfur so that it will be gravity discharged. Another possible method of collecting such sulfur would be to provide a continuous cascade of water down the inside wall of the base vessel to carry out the solid sulfur. A skimmer or other mechanical separating device would then be used to separate the water and sulfur and the water could be re-circulated. The same curtain of water could also be used to collect and carry materials other than sulfur, if so desired.

It should be apparent that conventional safety controls (not shown) can be, and normally will be used to automatically cut off flow of gas, air or water, should abnormal conditions develop in any of the systems through which they are passed.

In FIG. 12, there is shown, fragmentarily, how three of the reactors 20 of the invention can be economically connected to provide a plant of increased capacity.

A single feed chute 125 receives the material to be treated and directs it to the feed hoppers 21. The central exhaust stacks of the three reactors are all connected to a single vent stack 126 and, if desired, the gases being discharged therethrough can be used to preheat material being fed in through chute 125.

Although a preferred form of the apparatus of my invention has been herein disclosed, it is to be understood that the present disclosure is made by way of example and that variations are possible without departing from the hereinafter claimed subject matter I regard as my invention.

I claim:
1. A thermal reactor comprising
    a fine mesh support screen;
    means holding said support screen such that material to be heat treated can be retained on one side thereof;
    at least one surface-type combustion heater spaced from the side of the support screen on which material is to be retained;

an impermeable membrane, capable of absorbing and emitting heat, sealingly separating each said heater from the support screen;

means for feeding material to be heat treated onto said support screen;

means for moving said screen, whereby material thereon is moved past the impermeable membrane;

means for receiving products released from the material as the said material to be treated is moved past the impermeable membrane;

means for venting gases of combustion created by the operation of the surface combustion heaters; and means for removing the residue left after the products resulting from heat treatment have been released from the material being treated.

2. A thermal reactor according to claim 1, further including means for substantially sealing the reaction chamber formed between the impermeable membrane and the support screen against the admission of air; and means for selectively supplying fluid additives to the reaction chamber in controlled quantities.

3. A thermal reactor according to claim 1, further including means for insulating the walls defining a combustion chamber formed between the heaters and the impermeable membrane and the walls defining a reaction chamber formed between the impermeable membrane and the support screen from the walls of the base, the interior of which forms a collection chamber, against heat transfer.

4. A thermal reactor according to claim 1, wherein the surface-type combustion heaters each include a burner screen adapted to have combustion occur at one face thereof, a reflector surface spaced behind the screen and arranged to form a plenum chamber therewith so that fuel mixture supplied to the chamber will pass through the screen for surface combustion forwardly and outside of said chamber, a reverberator screen spaced from the burner screen, a forced cooling system for circulating coolant into cooling engagement with the reflector surface on the side opposite the plenum chamber, and means for introducing a fuel gas into the said plenum chamber.

5. A thermal reactor according to claim 1, wherein the means for holding the support screen comprises a series of rods extending outwardly from a central shaft; and wherein the means for moving the screen comprises drive means for rotating said shaft.

6. A thermal reactor according to claim 1, wherein the means for receiving the products of combustion includes a base vessel beneath the support screen.

7. A thermal reactor according to claim 5, wherein the base vessel is of inverted conical configuration.

8. A thermal reactor according to claim 1, wherein the means for removing the residue includes means for scraping it from the screen and an air lock into and through which the residue is discharged, substantially without admitting air to the reaction chamber formed between the support screen and the impermeable membrane.

9. A thermal reactor, comprising
a base having an open top;
a center post journaled upwardly through said base;
support means for said base;
means for rotating said center post;
a fine mesh support screen stretched above the open top of the base;
means supporting said screen and connecting it for rotation with the center post;
means for feeding material to be heated onto the said screen;
means for removing residue from said screen after the screen has been rotated around the center post from the means for feeding material onto the said screen;
a plurality of surface combustion heater means spaced around the center post between the means for feeding material and the means for removing residue; and
an impermeable membrane, adapted to absorb radiant energy from the heater means, but to preclude transfer of combustion gases, stretched as a sealed barrier between and spaced from the heater means and the screen.

10. A thermal reactor according to claim 9, wherein the base is of generally inverted conical formation and has a water supply conduit formed around its upper edge; and the impermeable membrane and the surface combustion heaters are supported on the water supply conduit; and further including a central exhaust stack; and means through which gases of combustion of the heaters are directed into the central exhaust stack.

11. A thermal reactor according to claim 10, wherein the surface-type combustion heaters each include a burner screen adapted to have combustion occur at one face thereof, a reflector surface spaced behind the screen and arranged to form a plenum chamber therewith so that fuel mixture supplied to the chamber will pass through the screen for surface combustion forwardly and outside of said chamber, a reverberation screen spaced from the burner screen, a forced cooling system for circulating coolant into engagement with the reflector surface on the side opposite the plenum chamber, and means for introducing a fuel gas into the said plenum chamber.

12. A thermal reactor according to claim 11, wherein the base is sealingly connected to the bottom of the water supply conduit;

means are provided to circulate water, as a coolant, from the water supply conduit into and through the forced cooling system of each of the heaters and back to the water supply conduit; and further including a heat exchanger;

a refrigeration system; and means for circulating water from said water supply conduit as a coolant through the heat exchanger and through the refrigeration system to be recooled.

13. A thermal reactor according to claim 12, further including a standpipe extending upwardly into the base to provide means through which gases are removed from the interior of the base;

means interconnecting the standpipe and the heat exchanger; and pump means connected to said heat exchanger for moving said gases therethrough.

14. A thermal reactor according to claim 12, further including discharge means connected through the base at the lowermost point thereof.

15. A thermal reactor according to claim 14, wherein the discharge means comprises a conduit for heavier liquids, having one open end substantially flush with the interior of the base and intermediate its length, being turned upwardly to a level above the said one open end and then being turned downwardly to have its other end adapted to discharge exteriorly of the base; and a conduit for lighter liquids having one open end extending through the base at a point just below the uppermost portion of the conduit for heavier liquids and its other end adapted to discharge the said lighter liquids exteriorly of the base.

16. A method of heat treating materials which comprises the step of spreading the material to be treated in a thin layer, over a perforate support screen;

passing said support screen and the material thereon beneath a series of gas-fired, surface combustion heaters;

sealing the gases of combustion formed by operation of the heaters from the material that is spread on the support screen, while transmitting the heat from the heaters to the material;

reverberating the radiant energy created by the surface combustion heaters to intensely heat an impermeable membrane used for sealing the gases of combustion from the material that is spread on the support screen, whereby the impermeable membrane emits radiant energy to the material on the support screen; and collecting the products of combustion released by the heating of the material, substantially as it is formed.

References Cited

UNITED STATES PATENTS

| | | |
|---|---|---|
| 784,854 | 3/1905 | Grace. |
| 2,393,422 | 1/1946 | Schneider _____ 110—36 |
| 2,832,474 | 4/1958 | Green. |

ROBERT D. BALDWIN, Primary Examiner

U.S. Cl. X.R.

23—269; 34—39; 75—7; 266—21